United States Patent
Unterweger et al.

(10) Patent No.: US 11,987,977 B2
(45) Date of Patent: May 21, 2024

(54) COMBINATION OF ANCHOR RAIL AND HAMMER HEAD ELEMENT

(71) Applicant: fischerwerke GmbH & Co. KG, Waldachtal (DE)

(72) Inventors: Roland Unterweger, Freudenstadt (DE); Christoph Wiedner, Feldkirch (AT); Falk Wittmann, Böhlen (DE)

(73) Assignee: FISCHERWERKE GMBH & CO. KG, Waldachtal (DE)

( * ) Notice: Subject to any disclaimer, the term of this patent is extended or adjusted under 35 U.S.C. 154(b) by 0 days.

(21) Appl. No.: 18/280,251

(22) PCT Filed: Mar. 3, 2022

(86) PCT No.: PCT/EP2022/055346
§ 371 (c)(1),
(2) Date: Sep. 4, 2023

(87) PCT Pub. No.: WO2022/189239
PCT Pub. Date: Sep. 15, 2022

(65) Prior Publication Data
US 2024/0068226 A1    Feb. 29, 2024

(30) Foreign Application Priority Data
Mar. 12, 2021   (DE) .................. 10 2021 106 024.9

(51) Int. Cl.
*E04B 1/41*     (2006.01)
*F16B 35/06*    (2006.01)

(52) U.S. Cl.
CPC ............ *E04B 1/4107* (2013.01); *F16B 35/06* (2013.01)

(58) Field of Classification Search
CPC ...... E04B 1/4107; F16B 35/06; F16B 37/045; B60P 7/0815; F16L 3/2431
See application file for complete search history.

(56) References Cited

U.S. PATENT DOCUMENTS

4,695,019 A * 9/1987 Lindberg ............... F16L 3/243
                                                        248/62
4,878,640 A   11/1989 Fricker et al.
(Continued)

FOREIGN PATENT DOCUMENTS

CN   209760461 U   12/2019
DE   37 01 530 A1   8/1988
(Continued)

OTHER PUBLICATIONS

International Preliminary Report on Patentability for corresponding Application No. PCT/EP2022/055346, issued Sep. 19, 2023.
(Continued)

*Primary Examiner* — Theodore V Adamos
(74) *Attorney, Agent, or Firm* — Renner, Otto, Boisselle & Sklar, LLP

(57) ABSTRACT

A combination of an anchor rail with a hammer head element for setting in concrete. In order to achieve the best possible load-carrying capacity in the longitudinal direction L of the anchor rail, the anchor rail has toothing, specifically in a region close to a slot-like opening for the insertion of the hammer head element. The hammer head element, in a force-free state, rests only on the toothing and comes to rest over an entire head upper side only in the case of increased tensile forces, as a result of which the force transmission moves outwards to side walls of the anchor rail. This facilitates the load-carrying capacity of the anchor rail with respect to tensile forces.

12 Claims, 2 Drawing Sheets

(56) References Cited

U.S. PATENT DOCUMENTS

| | | | | |
|---|---|---|---|---|
| 4,950,099 | A | * | 8/1990 | Roellin ................ B62D 33/044 403/348 |
| 5,165,628 | A | * | 11/1992 | Todd .................... F16B 37/045 248/62 |
| 5,655,865 | A | | 8/1997 | Plank |
| 6,827,531 | B2 | * | 12/2004 | Womack ............... B60P 7/0815 410/104 |
| 8,234,832 | B2 | | 8/2012 | Birnbaum et al. |
| 10,604,057 | B2 | * | 3/2020 | Gettel .................. B60P 7/0815 |
| 2020/0309184 | A1 | * | 10/2020 | Schuit .................... F24S 25/30 |
| 2023/0183965 | A1 | | 6/2023 | Unterweger et al. |

FOREIGN PATENT DOCUMENTS

| | | | |
|---|---|---|---|
| DE | 10 2008 054 807 A1 | 6/2010 | |
| DE | 20 2017 002 013 U1 | 8/2017 | |
| DE | 10 2019 106 923 A1 | 9/2020 | |
| EP | 3 643 846 B1 | 4/2020 | |
| EP | 3 643 847 B1 | 4/2020 | |
| EP | 3 712 339 A1 | 9/2020 | |
| GB | 2374613 A * | 10/2002 | .......... E04F 13/0816 |

OTHER PUBLICATIONS

International Search Report for corresponding Application No. PCT/EP2022/055346, mailed Jun. 15, 2022.

Written Opinion for International Search Report for corresponding Application No. PCT/EP2022/055346, mailed Jun. 15, 2022 Jun. 15, 2022.

International Preliminary Report on Patentability for International Search Report for corresponding Application No. PCT/EP2022/055346, mailed Sep. 19, 2022.

Search Report for related German Application No. 10 2021 106 027.3, mailed Mar. 4, 2022.

* cited by examiner

COMBINATION OF ANCHOR RAIL AND HAMMER HEAD ELEMENT

TECHNICAL FIELD

The invention relates to a combination of an anchor rail with a hammer head element.

DISCUSSION OF THE RELATED ART

Anchor channels which are set in concrete are known for fastening objects to a concrete structure. Typically, the anchor rails have a rail with anchor bolts attached thereto. Prior to being set in concrete, the anchor rails are nailed or screwed to the formwork with one side of the rail designated as "upper side" in the following, so that only the upper side is accessible after the concrete has cured. In the following, the directions "upper" and "lower" or terms such as "upper side" and "lower side" are always used as they correspond to the installation situation in the floor. Accordingly, in an installation situation to a ceiling, the upper side of the rail faces downward. The upper side has a slot-like opening so that a hammer head element can be inserted and anchored by rotation by, for example, 90°. Hammer head screws, hammer head bolts and hammer head nuts are understood in this context as "hammer head elements." Lips extend from side walls of the rail to the opening and are gripped from behind by the hammer head element. On a lower side opposite the upper side, the rails typically have downwardly projecting anchor bolts, wherein in this context an "anchor bolt" is understood to mean both the widely used rotationally symmetrical bolts and special forms with the same function, such as sheet metal strips, wires or the like. The anchor bolts have the function of guiding forces, which for example act on the rail from a hammer head screw, into the surrounding concrete. However, there are also anchor rails without anchor bolts. In particular, these are also used as mounting rails for fastening without being set in concrete.

The load-bearing capacity of such anchor rails is determined using various instances of loads. In particular, this involves on the one hand tractive forces acting perpendicular to the upper side, and on the other hand transverse forces acting parallel to the longitudinal extension of the rail.

SUMMARY OF THE INVENTION

The object of the invention is to propose a combination consisting of an anchor rail and hammer head element with increased load-bearing capacity.

This object is achieved according to the invention by the combination of an anchor rail with a hammer head element having features described herein. The invention proposes an anchor rail, in particular for being set in concrete, with a rail. The rail has a cross-section with a substantially constant C-shaped profile. The rail is produced in particular from a sheet metal strip by roll bending. "C-shape" in this context also includes in particular angular profiles. The profile extends along a longitudinal direction, wherein the profile has an inner side and an outer side and an, in particular substantially rectangular, contour. In particular, the corners of the profile are rounded. The profile has a lower side and an upper side opposite the lower side, as well as two connecting sides connecting the top and lower sides. In addition to substantially rectangular contours, those contours in particular are also included in which the lower side tapers downward, for example in order to receive a head of an anchor bolt.

An opening in the C-shaped profile extends in the longitudinal direction in the upper side of the rail. The opening can also be regarded as a slot. The opening serves in particular for the insertion of the hammer head element according to the invention.

In particular, multiple anchor bolts are arranged on the lower side of the rail, wherein the rail can also have no anchor bolts at all or other anchor elements.

The connecting sides are formed by side walls of the rail. The side walls are in particular planar and in particular parallel to one another, but they can also be e.g. somewhat curved and/or inclined inward to the upper side. The side walls in particular have a substantially uniform thickness. The connecting sides are in particular straight.

The interior of the rail can be sealed or filled with an elastic material such as foam in order to prevent concrete from flowing into it. After the concrete has cured, the seal or filling can be removed.

On the upper side, lips extend from the side walls to the opening in each case. The lips accordingly have a projection from the side walls to the opening. The lips serve in particular to engage behind the hammer head element. The hammer head element has a hammer head which can be inserted into the opening in a first orientation and can be brought into contact with the lips on the inner side in a second orientation, specifically with a head side of the hammer head facing the lips. The two orientations differ in particular by a rotation about an axis perpendicular to the upper side of the anchor rail. The rotation is in particular 60° to 90°, preferably 90°.

Furthermore, a distinction is made between an inserted, force-free state in which the hammer head does not cause a force-related deformation of the lips, and a loaded state in which a service load acts on the hammer head. In the following, these states are referred to merely as a "force-free state" and "loaded state." In this case, "force-free" is not meant in absolute terms since in principle any contact leads to a transmission of force, but in the sense of mere contact by hand or from intrinsic weight in the case of overhead mounting. In particular, a tensile force of a maximal of 100 N is transmitted. In contrast, the "loaded state" means that there is a state achievable as intended in which, in particular, a tensile force acts as a service load perpendicular to the upper side away from the rail. The "service load" is in particular over 20 kN and preferably over 30 kN and is caused, for example, by the intrinsic weight and wind loads on a facade fastened with the anchor rail.

In the inserted, force-free state, the hammer head according to the invention can be brought into contact with the upper side on the inside of the profile in a region of the lips facing the opening. At the same time, there is a distance between the respective lip and the head upper side in a region of the lips facing the side walls. In other words, the hammer head is in contact in the center while there is a lateral gap. "Lateral" hereinafter means the regions close to the side walls, and "central" means the regions close to the opening. This contact ensures that, when there are low tensile forces, there is a defined contact in a small region of the head upper side which promotes the transmission of transverse forces. The contact in a small region can be used in particular to produce a form-fit between the hammer head and the rail, wherein this can result from already existing complementary geometries, or is created through assembly, for example in that a knurl is stamped into the lip on the upper side.

In a loaded state in which higher tensile forces such as 40 kN act, the hammer head preferably comes into contact in the region of the lips facing the side walls by the lips deforming in addition to the region of the lips facing the opening. The deformation is thereby due to the service load. In this state, the hammer head is in contact essentially by the entire top of the head. As a result, the tensile force is introduced into the lips at least also close to the side walls, whereby the leverage which causes the lips to bend open, is shortened. Alternatively, instead of contacting the middle and side, the contact could be exclusively laterally, i.e., switch directly from the middle to the side. However, this can have an unfavorable effect on the transferability of transverse forces. The invention therefore proposes designing the contours in such a way that initially, an additional contact is produced laterally and only when there are even higher tensile forces, for example 60 kN, in that a distance between the respective lip and the top is produced in the region of the lips facing the opening. In other words, the hammer head is in contact laterally when there are very high tensile forces while a gap is in the center. Accordingly, the hammer head is still held securely in the immediate vicinity of the side walls.

In order to achieve a form fit between the rail and the hammer head element in the longitudinal direction of the rail, the invention proposes that the lip has a toothing on the inner side in a region closer to the opening than to the side wall. In contrast, the lips have no toothing on the inner side in a region facing the side walls. The toothing-free part ensures that the thinner part of the lip is not weakened by teeth. Contact in a force-free state is made in particular exclusively in the region of the toothing, wherein there does not have to be contact over the entire width of the toothing. The fact that, as claimed, the hammer head and the lips can be "exclusively" brought into contact with the teeth and the toothings refers to a state in which the hammer head is brought into contact in an intended second orientation as described, and not to a hypothetical state in which the hammer head is brought into contact, for example, at such an angle that the hammer head element cannot be used at all for fastening an object.

Preferably, the lateral regions of the lips in which the hammer head is at a distance in a force-free state extend in the direction towards the opening up to a limit which corresponds at least to 0.25 times, in particular at least 0.4 times, the projection of the lip. In other words, there is no lateral contact of the hammer head with the lip beyond 0.25 times the projection. The aforementioned effect of the small-area contact for the transmission of transverse forces with low tensile forces is hereby promoted.

To effectively transmit transverse forces with lower tensile forces and to achieve the force transmission as described in the vicinity of the side walls with higher tensile forces, the distance between the respective lip and the head upper side must not be too large or too small. In the following, the "distance" refers in each case to the distance between the respective lip and the head upper side, wherein the distance is measured perpendicular to the extension of the upper side. This understanding stems from the fact that, with higher tensile forces, a movement of the hammer head is essentially perpendicular to the extension of the top side, and the gap from the distance is more or less closed in this direction. Preferably, the maximum distance at both lips in the force-free state corresponds to 1% to 30%, in particular 5% to 10%, of the respective projection of the lip.

Additionally or alternatively, the invention proposes that the maximum distance at both lips in a force-free state corresponds to a maximum of 60% of the difference between the maximum thickness and the minimum thickness of the lip. In this case and in the following, the thickness of the lip is measured perpendicular to the extension of the upper side. When there is an optional toothing on the lip, the thickness relates to the envelope contour, since this is relevant for stability, and not for example to the contour in the tooth base. In particular, the maximum thickness of the profile over the entire length along the longitudinal direction is always the thickness at a certain point along the direction towards the opening.

In absolute terms, the invention proposes that the maximum distance at both lips in the force-free state is always between 0.1 mm and 1.5 mm, in particular between 0.2 mm and 1.0 mm.

The thickness of the lips preferably always extends in the direction toward the opening, as a result of which the rigidity relative to tensile forces on the hammer head element is improved compared to a constant thickness. "In the direction toward the opening" always means the direction from the connection side to the opening. The extension is in particular constant, but it can also have jumps.

On the one hand, in order to achieve a high level of stability in terms of the holding forces, but on the other hand also to leave sufficient space inside the rail for mounting a hammer head element, the invention proposes that the ratio of the minimum thickness of the lip to the maximum thickness of the lip is between 0.4 and 0.8, in particular between 0.5 and 0.75.

Preferably, the maximum thickness of the lip corresponds to at least 1.6 times, in particular at least 1.8 times, the minimum thickness of the side wall. By such a minimum ratio, sufficiently large wall thicknesses and sufficiently large amounts of the angle of attack on the lip can be achieved in order to achieve high holding forces.

The ratio of the projection of the lip to the thickness is also important for the stability and space inside the rail. The invention proposes that the maximum thickness of the lip corresponds to at least 0.5 times, in particular at least 0.6 times, the projection of the lip.

The features and feature combinations, embodiments, and designs of the invention as mentioned above in the description, as well as the features and feature combinations as mentioned below in the description of figures and/or drawn in a figure, are usable not only in the combination indicated or shown in each case; rather, in principle any other combinations are also usable, or said features can be used individually. Embodiments of the invention are possible which do not have all features of a dependent claim. Individual features of a claim can also be replaced by other disclosed features or feature combinations.

The invention is explained below with reference to an exemplary embodiment. The figures are substantially true to scale.

DETAILED DESCRIPTION OF THE INVENTION

Figure 1:
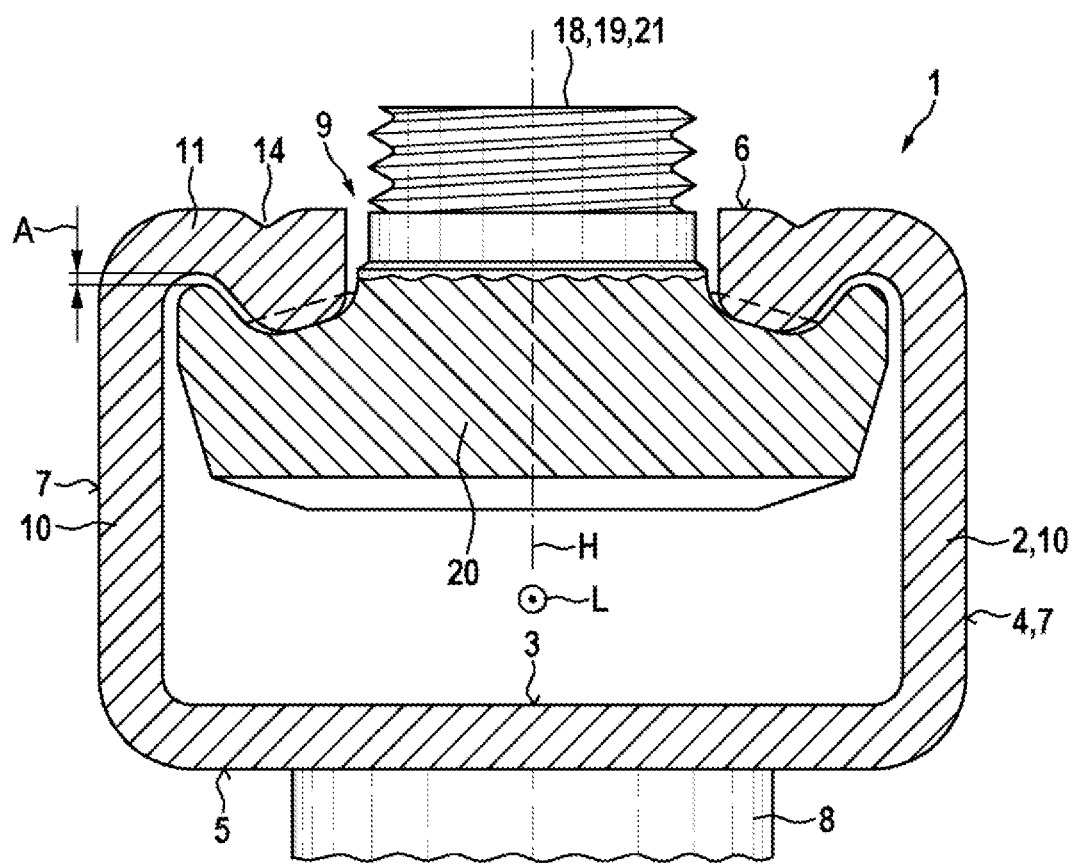
FIG. 1 shows a combination according to the invention of an anchor rail with a hammer head screw in a sectional view.
Figure 2:
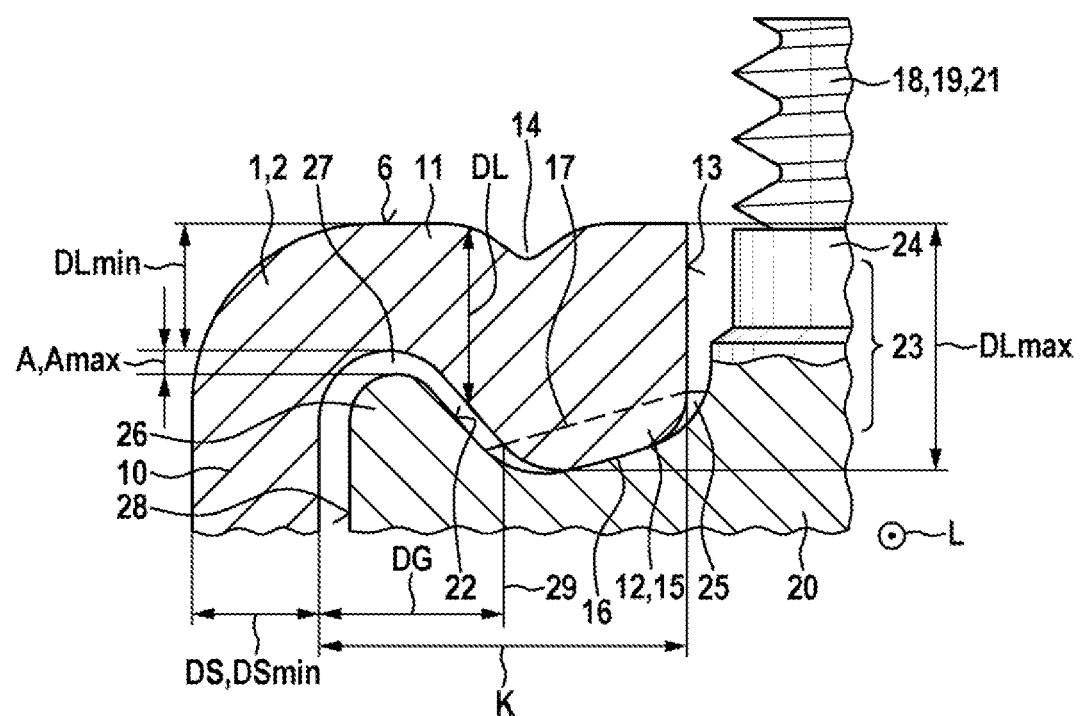
FIG. 2 shows an enlarged sectional view of the same combination in the region of the contact between the head upper side of the hammer head screw on a lip of the anchor rail.

The exemplary embodiment shown in FIGS. 1 and 2 shows a cross-section through an anchor rail 1 according to the invention. The anchor rail 1 has a rail 2 with a C-shaped profile which extends along a longitudinal direction L, wherein the longitudinal direction L runs perpendicular to the plane of the drawing in all the figures. The profile of the rail 2 has an inner side 3 and an outer side 4 and a substantially rectangular outline with rounded corners. The outline also has a lower side 5 and an upper side 6 opposite the lower side 5 which are connected on both sides by connecting sides 7. The lower and upper sides 5, 6 are approximately 1.5 times as long as the connecting sides 7.

Multiple anchor bolts 8 in the form of headbolts are arranged on the lower side 5. Since the anchor bolts 8 are arranged one behind the other in the longitudinal direction L, only one of the anchor bolts 8 is visible. The anchor bolt 8 is also only partially shown, since it is not important in the following. A slot-like opening 9 of the C-shaped profile extends along the upper side 6 in the longitudinal direction L. The connecting sides 7 are formed by side walls 10. Lips 11 extend from the side walls 10 to the opening 9 in each case on the upper side 6. In the region of the openings 9, the inner side 3 transitions by end faces 12 of the lips 11 into the outer side 4.

The thickness DL of the lips 11 increases in each case in the direction toward the opening 9. The thickness DL of the lips 11 therefore does not increase by a constant amount. The thickness DL of the lips 11 is always measured perpendicular to the extension of the upper side 6. The "extension" means the extension along the direction from the connection side 7 to the opening 9.

In the following, one of the two lips 11 is described, wherein the other lip 11 is mirror-symmetrical in the exemplary embodiment like the entire anchor rail 1. On the inner side 3, the side wall 10 transitions by a radius into the lip 11. The thickness DS of the side wall 10 is constant and accordingly also corresponds to a minimum thickness DSmin of the side wall 10. Starting from the side wall 10, the inner side 3 passes the narrowest point of the lip 11, that is to say the location with a minimum thickness DLmin of the lip 11, and then runs at an angle of approximately 50° to the upper side 6 up to an inverted radius at which the lip 11 assumes a maximum thickness DLmax. The maximum thickness DLmax of the lip 11 corresponds approximately to 2.0 times the thickness DS of the sidewall 10, and the minimum thickness DLmin corresponds approximately to 0.5 times the maximum thickness DLmax of the lip 11.

Starting from the location of the maximum thickness DLmax, the inner side 3 extends with a rounding 12 and an average angle of approximately 15° to the upper side 6 to an end face 13 of the lip 11 which extends flat and perpendicular to the upper side 6. The end faces 13 define a projection K of the lip 11 from the side wall 10 to the opening 9, which can also be regarded as an "extension of the lip 11." The ratio of the maximum thickness DLmax of the lip 11 to the projection K is approximately 0.7. The upper side 6 is not completely flat but has a production-related groove 14 running in the longitudinal direction L.

In the region of the rounding 12, the lip 11 has a toothing 15 extending in the longitudinal direction L. Tooth tips 16 extend perpendicular to the longitudinal direction L and form the rounding 12, while a respective tooth base 17 is straight and runs at an angle of approximately 15° to the upper side 6. The previously described thickness DL of the lip 11 relates to the envelope contour of the toothing 15, that is to say to the tooth tips 16 and not to the contour in the tooth base 17, and emerges from a flat upper side 6, and accordingly does not take into account the groove 14.

The rail 2 is formed from a flat sheet metal strip in a multi-step rolling bending method (not shown). The lips 11 are thickened in particular by lateral rollers which act on the end faces of the sheet metal strip.

A hammer head screw 18 is inserted into the rail 2 as a hammer head element 19. For this purpose, a hammer head 20 of the hammer head screw 18 was aligned along the opening 9, i.e., in the longitudinal direction L of the rail 2. The hammer head 20 was then rotated by 90° into the shown position. For better clarity, only part of a thread 21 of the hammer head screw 18 is shown. An element to be fastened can be connected via the thread 21 (not shown) by means of a nut and a washer. The tightening of the nut causes the hammer head 20 to be pulled against the inner side 3 of the rail 2 in the region of the lip 11. The hammer head 20 has a geometry corresponding to the lip 11 on its head upper side 22 facing the lip 11. Starting from a transition region 23 in which the thread 21 transitions over a cylindrical portion 24 into the hammer head 20, a toothing 25 extends on both sides on the head upper side 22, the flank geometry of which corresponds to the flank geometry of the toothing 15 in such a way that the toothing 15 rests substantially against the entire surface of the toothing 25. For this purpose, the flanks of the toothing 25 fall to the side from the transition region 23 at an angle of approximately 75° to a longitudinal axis H of the hammer head screw 18, wherein "to the side" means the direction away from the longitudinal axis H of the hammer head screw 18. Continuing to the side, the toothing 25 is adjoined by a contour which in turn corresponds with the lip 11, and thereby forms an elevation 26. However, the elevation 26 does not lie on the lip 11 but forms a gap 27. In other words, there is a distance A between the respective lip 11 and the head upper side 22. The distance A is measured perpendicular to the upper side 6 substantially over the entire gap 27 and forms a maximum distance Amax. Starting from the elevation 26, the hammer head 20 terminates laterally with a flat side surface 28 which is parallel to the longitudinal axis H of the hammer head screw 18.

The cylindrical section 24 has a diameter which corresponds to more than 80%, in the exemplary embodiment approximately 88%, of the width of the opening 9.

The illustrated state is an inserted, force-free state within the meaning of the invention, that is to say, the hammer head element 19 is inserted into the rail 2 and rests against the lips 11 with at most slight force, wherein no significant deformation occurs. This includes that the hammer head screw 18 is fixed to a nut (not shown) that is screwed against the upper side 6. The hammer head 20 rests with its toothing 25 on the inner side 3 in a region of the lips 11 facing the opening 9, while in a region of the lips 11 facing the side walls 10, there is the distance A between the respective lip 11 and the upper side 22 from the gap 27. The region with distance A extends up to a limit 29. A distance DG from the side wall 10 to the limit 29, measured parallel to the upper side 6, corresponds approximately to half the projection K of the lip 11. The maximum distance Amax is approximately 0.6 mm and accordingly corresponds approximately to 7% of the projection K and approximately a quarter of the difference between the maximum thickness DLmax and the minimum thickness DLm in of the lip 11.

The anchor rail 1 is intended to be set in a base made of concrete (not shown) in such a way that the upper side 6 terminates with the concrete surface, and the opening 9 is accessible for inserting the hammer head element 17. For example, a substructure for a facade can be fastened thereto.

For example, due to the intrinsic weight and wind suction forces acting on a facade, tensile forces, i.e., forces along the longitudinal axis H of the hammer head bolt 18, and transverse forces, i.e., forces perpendicular to the tensile forces, are transmitted from the hammer head element 19 to the anchor channel 1 as a service load. The transverse forces which act parallel to the longitudinal direction L of the rail 2 can thereby be transmitted very effectively by the teeth 25 and the toothing 15. Due to the fact that the hammer head 20 only rests against the lip 11 in this region, the form-fit can act particularly effectively. Should high tensile forces act as a service load, a loaded state is established within the meaning of the invention. Accordingly, a tensile force causes an upward deformation of the lips 11 in the figures, which can also be understood as bending the lips 11 (not shown). As a result, in addition to the toothing 15, the region in which the gap 27 was previously present comes into contact, i.e., a region of the lips 11 facing the side walls 10. As a result of the additional contact, the force is introduced into the lip 11 further in the direction of the side walls 10 which can also be understood as "less centrally" or "lateral." This reduces the effective leverage with which the lip 11 is bent open, accordingly counteracting further deformation and failure.

LIST OF REFERENCE SIGNS

Combination of Anchor Rail and Hammer Head Element
 1 Anchor rail
 2 Rail
 3 Inner side
 4 Outer side
 Lower side
 6 Upper side
 7 Connection side
 8 Anchor bolt
 9 Opening
 10 Sidewall
 11 Lip
 12 Rounding
 13 End face of lip 11
 14 Groove
 Toothing
 16 Tooth tip
 17 Tooth base
 18 Hammer head screw
 19 Hammer head element
 20 Hammer head
 21 Thread
 22 Head upper side
 23 Transition region
 24 Cylindrical section
 Teeth
 26 Elevation
 27 Gap
 28 Side surface
 29 Limit
 A Distance between lip 11 and head upper side 22
 Amax Maximum distance between lip 11 and head upper side 22
 DG Distance from side wall 10 to limit 29
 DL Thickness of the lip 11
 DLmax Maximum thickness of the lip 11
 DLmin Minimum thickness of the lip 11
 DS Thickness of the side wall 10
 DSmin Minimum thickness of the side wall 10
 H Longitudinal axis of the hammer head screw 18
 K Projection of the lip 11
 L Longitudinal direction of the rail 2

The invention claimed is:
1. A combination of an anchor rail, in particular for setting in concrete, with a hammer head element,
    wherein the anchor rail has a rail which has a cross-section with a substantially uniform, c-shaped profile which extends along a longitudinal direction, wherein the profile has an inner side and an outer side and a, in particular substantially rectangular contour with a lower side, an upper side opposite the lower side, and two connecting sides which connect the upper side and the lower side, wherein an opening of the C-shaped profile extends on the upper side in the longitudinal direction, wherein in particular at least two anchor bolts are arranged on the lower side of the rail, wherein the connecting sides are formed by side walls of the rail,
    wherein lips each extend on the upper side with a projection from the respective side wall to the opening,
    wherein the hammer head element has a hammer head which is configured to be inserted into the opening in a first orientation and configured to be brought into contact on the inner side of the lips with an upper side facing the lips in a second orientation,
    wherein the hammer head in the second orientation is configured to be in an inserted, force-free state in which the hammer head does not cause a force-related deformation of the lips, and while in a region of the lips facing the side walls, there is a distance between the respective lip and the head upper side,
    wherein the lips have a toothing on the inner side in a region facing the opening and no toothing in a region facing the side walls,
    wherein the hammer head has teeth and, in the inserted, force-free state in the second orientation, the hammer head and the lips are configured to be brought into contact exclusively with the teeth and the toothings in a manner such that the toothing rests against an entire surface of the teeth, and
    wherein, the hammer head is configured to be transitioned from the force-free state to a loaded state in which a service load acts on the hammer head, and in the loaded state the lips are configured to have a deformed configuration relative to a configuration of the lips in the force-free state such that the deformed configuration comprises the hammer head and the lips being in contact where the distance between the respective lip and the head upper side previously was present in the force-free state.

2. The combination according to claim 1, wherein the region of the lips facing the side walls in which the hammer head has a distance in the inserted, force-free state, extends in the direction towards the opening up to a limit which corresponds at least to 0.25 times the projection of the lip.

3. The combination according to claim 1, wherein the maximum distance between the respective lip and the head upper side at both lips corresponds to 1% to 30% of the respective projection of the lip in the inserted, force-free state, wherein the distance is measured perpendicular to the extension of the upper side.

4. The combination according to claim 1, wherein the maximum distance between the respective lip and the head upper side at both lips in the inserted, force-frees state corresponds in each case to a maximum of 60% of the difference between the maximum thickness and the minimum thickness of the lip, wherein the distance is measured perpendicular to the extension of the upper side.

5. The combination according to claim 1, wherein the maximum distance between the respective lip and the head upper side at both lips in the inserted, force-free state is always between 0.1 mm and 1.5 mm, wherein the distance is measured perpendicular to the extension of the upper side.

6. The combination according to claim 1, wherein the thickness of the lip always widens in the direction towards the opening.

7. The combination according to claim 1, wherein the ratio of the minimum thickness of the lip to the maximum thickness of the lip is between 0.4 and 0.8.

8. The combination according to claim 1, wherein the maximum thickness of the lip corresponds to at least 0.5 times the projection of the lip.

9. The combination according to claim 1, wherein the region of the lips facing the side walls in which the hammer head has a distance in the inserted, force-free state, extends in the direction towards the opening up to a limit which corresponds to at least 0.4 times the projection of the lip.

10. The combination according to claim 1, wherein the maximum distance between the respective lip and the head upper side at both lips in the inserted, force-free state is always between 0.2 mm and 1.0 mm, wherein the distance is measured perpendicular to the extension of the upper side.

11. The combination according to claim 1, wherein the ratio of the minimum thickness of the lip to the maximum thickness of the lip is between 0.5 and 0.75.

12. The combination according to claim 1, wherein the maximum thickness of the lip corresponds to at least 0.6 times the projection of the lip.

\* \* \* \* \*